United States Patent Office 3,427,293
Patented Feb. 11, 1969

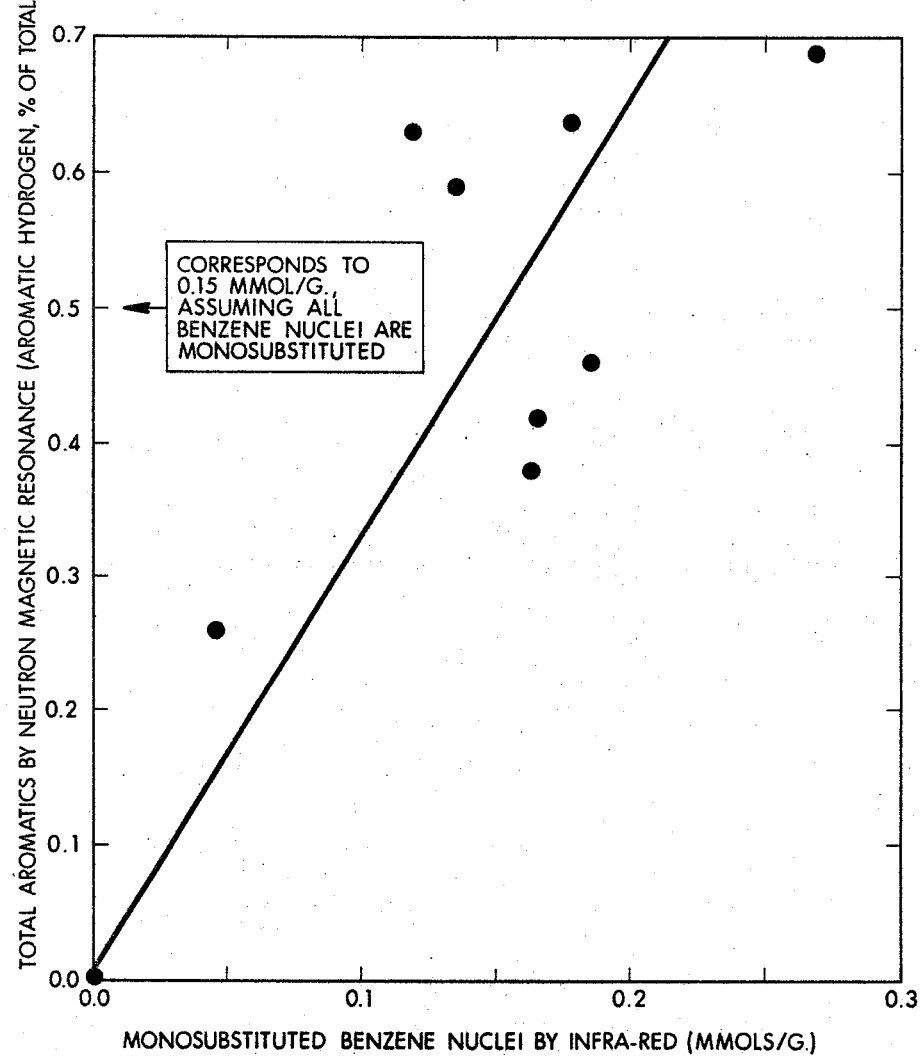

3,427,293
PHOSPHORYLATION OF HYDROCARBON RESINS
Roby Bearden, Jr., and Clyde L. Aldridge, Baton Rouge, La., assignors to Esso Research and Engineering Company, a corporation of Delaware
Continuation-in-part of application Ser. No. 412,846, Nov. 20, 1964. This application Oct. 27, 1967, Ser. No. 678,563
U.S. Cl. 260—82    10 Claims
Int. Cl. C08d 5/00; C08f 27/00

ABSTRACT OF THE DISCLOSURE

Steam-cracked petroleum resins are reacted with $PCl_5$, $PCl_3$, $POCl_3$, $RPCl_2$, $R_2PCl$, $ROPCl_2$, or $(RO)_2PCl$ where R is alkyl or aryl in the presence of a Lewis acid, such as $AlCl_3$ or clay and the reaction is quenched with water, alcohols, glycols, ammonia, amines or diamines to increase softening point flame resistance and improve odor and dyeability.

Related applications

This application is a continuation-in-part of Ser. No. 412,846, filed Nov. 20, 1964, now abandoned, for Roby Bearden, Jr., and Clyde Lee Aldridge.

Background

This invention relates to a method for improving the properties of hydrocarbon resins prepared by polymerizing unsaturated hydrocarbon-containing streams with an acidic polymerization catalyst. More particularly this invention relates to a method for improving the softening point, the dyeability, flame resistance and odor-stability of such resins.

Hydrocarbon resins can be produced from certain unsaturated petroleum refinery streams which contain various mixtures of acyclic and cyclic olefins and diolefins by contact with a Friedel-Crafts type catalyst under relatively low temperatures, e.g. $-20°$ to $+90°$ C. The hydrocarbon mixtures obtained by steam-cracking petroleum oils have been found to be especially useful for this purpose. These distillates are prepared by cracking petroleum fractions such as kerosene, gas oil, naphtha or residua in the presence of large amounts of steam, e.g. 50 to 90 mole percent at temperatures of approximately 1000 to 1600° F. This steam-cracking process is well known in the patented art and literature. The cracked liquid fraction ordinarily contains small amounts of cyclopentadiene monomers, which are usually at least partially removed by thermal treatment of the fraction to cause dimerization of the cyclodiene. However, the cyclodienes may be left in if desired. These resins are useful for the preparation of floor tiles, in paints, for varnish manufacture or the like. In general, various steam-cracked hydrocarbon streams such as described above may be employed as feed to the polymerization. For example, a resin may be prepared from feed stocks having a relatively wide boiling range, e.g. 50° to 170° C. from which essentially all of the $C_4$ hydrocarbons and lighter hydrocarbons have been removed. It is also sometimes advantageous to remove the isoprene from the naphtha. This feed contains various amounts of non-reactive aromatics, i.e. it is free from reactive aromatics such as styrene, vinyl toluene, indene and the like.

Table I below shows one general set of specifications for such feed streams, showing both distillation ranges and chemical composition. Table II then shows the compositions of typical feed streams in which steam-cracked naphtha samples represent desirable feed streams for use in producing essentially non-aromatic resins.

TABLE I.—SPECIFICATIONS FOR RESIN FEED STREAMS (Boiling range 50–170° C., predominantly 50–105° C. and containing 5–10 wt. percent or less boiling below 50° C., 5–10 wt. percent or less isoprene.)

| Distillation range: | Weight percent |
|---|---|
| I.B.P. 50° C. | 0–30 |
| 50–70° C. | 20–60 |
| 70–130° C. | 30–95 |
| 130° + | 0–5 |
| Preferred Composition: | |
| Diolefins (conjugated) | 10–30 |
| Isoprene | 0–5.0 |
| Piperylene | 5–15.0 |
| Cyclodienes | 0–5.0 |
| Other diolefins | 1–10.0 |
| Aromatics | 10–65 |
| Benzene | 10–40 |
| Toluene | 1–20 |
| $C_8$ aromatics | 0–5 |
| Paraffins | 0–5 |
| Olefins | 30–80 |

The diolefin content of the above mixture was determined by reacting a mixture of 1.5 to 3.0 ml. of sample and 2.5 ml. of chloromaleic anhydride (diluted with 2 ml. benzene containing 0.1% tertiary butyl catechol) for three hours at 100° C., and steam distilling the resulting reaction mixture for two hours to recover HCl (1 mole/mole of diolefin).

TABLE II.—COMPOSITION OF TYPICAL RESIN FEED STREAMS FOR NON-AROMATIC RESINS

| Naphtha | A | B | C | D | E |
|---|---|---|---|---|---|
| Distillation, wt. percent overhead: | | | | | |
| I.B.P. to 60° C | 13.5 | 3.5 | 3.9 | 8 | 0 |
| 60–70 | 32.5 | 39 | 39.9 | 25 | 31 |
| 70–130 | 53 | 54.5 | 52.7 | 64 | 69 |
| 130 plus | 1 | 3.0 | 3.5 | 3 | <1 |
| Composition, wt. percent: | | | | | |
| Diolefins | 19.4 | 16.2 | 15 | 14 | 19 |
| Isoprene | 3.1 | <1 | <1 | <1 | <1 |
| Piperylene | 8.8 | 9.8 | 8.3 | 8.3 | |
| CPD's | 1.0 | 1.8 | 1.2 | 0.9 | <1 |
| Others | 6.5 | 4.6 | 3.5 | 4.8 | |
| Aromatics: | | | | | |
| Benzene | 19.2 | 22.1 | 19.6 | 29.1 | 30 |
| Toluene | 7.4 | 8.1 | 4.2 | 6.8 | 8 |
| $C_8$ aromatic | <1 | <1 | <1 | <1 | <1 |
| Paraffins | 3 | 3 | 1 | 1 | 2 |
| Olefins | 51 | 50.6 | 60.2 | 49.1 | 41 |

The above selected feed streams may be polymerized in either a batchwise or continuous manner with a Friedel-Crafts catalyst such as boron trifluoride and especially with an aluminum halide catalyst of a concentration of about 0.5 to 10%, advantageously at about 1.0–5.0% at about $-40°$ C. to about $+70°$ C., advantageously at about 0° to $+60°$ C., under conditions of good agitation. The essentially non-aromatic resin thus formed may be recovered by water and/or alkali washing to remove catalyst, followed by stripping off the unpolymerized material. One good way to remove the catalyst is to add methyl alcohol to form a solid complex with $AlCl_3$, which is then filtered off. However, other methods for removing the catalyst from the polymerized products may be used.

The washed resin solutions are then stripped of unreacted hydrocarbons boiling up to the end point of the feed naphtha, about 170° C. The resulting crude resin concentrate is then stripped under vacuum or with steam to remove liquid polymer and to recover a solid resin product having a softening point of 80° C. or higher. Such a resin product, for example, might be obtained by stripping to a bottoms temperature of 260 to 270° C. at a pressure of 2 to 5 mm. Hg.

The resulting train is essentially of very low or no aromatic content and substantially free of cross-linking. It has a melt viscosity (cps.) of about 100–30,000, preferably about 150–20,000, at practical hot mixing and forming temperatures of about 90–260° C., preferably 120–225° C. It has a cold/hot viscosity ratio (300° F./500° F.) below 40, preferably 1–20. The average molecular weight is about 1000 to 2000 and its specific gravity is about 0.96–0.98, generally about 0.97. FIGURE 1 shows that the resin contains only between about 0.05 and 0.27 millimole of aromatic rings per gram of resin. The resin has the following typical properties:

TABLE III.—PROPERTIES OF RESIN

The following are typical properties of all grades:
Color, coal tar scale—2
Color, Gardner scale—11
Color, rosin scale—E
Refractive index—1.53
Specific gravity—0.96–0.98
Pounds per gallon—8.01
Gallons per pound—0.1249
Pounds per gallon, 70% solution in mineral spirits—7.67
Specific heat—0.45
Ash content—<0.1%
Acid number—<1
Saponification number—<1
Dielectric constants:
　100 cycles 2.33±0.05
　10,000 cycles 2.33±0.05
　1 megacycle 2.33±0.05
　100 megacycles 2.33±0.05
Loss Tangent:
　100 cycles 0.0003
　10,000 cycles 0.0003
　1 megacycle 0.0005
　100 megacycles 0.0008+0.0004
Melting point, ball-and-ring (ASTM)—100° C.
Molecular weight—1400
Bromine number (electrometric)—36
Iodine number (corrected)—60
Iodine number (Wijs method)—145
Flash point (C.O.C.)—510° F.
Fire point (C.O.C.)—575° F.

It is desirable for many uses, e.g., in floor tiles, to obtain resins having relatively high softening points. It is also desirable to produce light colored resins that may be dyed to any desired color. Furthermore, the resin should not develop any odor in storage due to oxidation and for many purposes it is desirable for the resin to be flame resistant. A resin having all of the above properties has not been obtainable up to now because when one property is enhanced others are degraded. For example, to increase the softening point of the resin divinyl benzene and cyclopentadiene have been added to the resin feed. When divinyl benzene is added the shelf life of the resin is decreased and when cyclopentadiene is used, there is a degradation in color and odor of the finished resin. The color of the resin can be improved by hydrogenation but softening point is either unaffected or is in some cases lowered.

It has been known that the dyeability and flame resistance of low molecular weight polymers can be improved by the introduction of phosphorous containing functional groups into the polymer molecule by reacting the polymer with $PCl_3$ and oxygen. (See Schroeder and Sopchak, Journal of Polymer Science, vol. 47, p. 417 (1960).) Unfortunately, however, this method is limited in scope and cannot be applied to polymers containing much chain branching or even trace quantities of free radical inhibitors such as sulfur. Thus this reaction does not apply to petroleum resins as described above.

Summary

In accordance with the present invention the stripped resin, whether a CTLA polymer or prepared by Friedel-Crafts polymerization of steam-cracked fractions, is reacted with 0.5 to 100 weight percent (based on resin), preferably 5 to 25 weight percent, of a halogenated phosphorus compound chosen from the group consisting of $PCl_3$, $PCl_5$, $POCl_3$, $RPCl_2$, $R_2PX$, $ROPCl_2$ or $(RO)_2PCl$ where R is alkyl or aryl in the presence of equal molar equivalents of a Lewis acid catalyst such as $AlCl_3$ or other Friedel-Crafts catalyst such as $AlBr_3$, $SnCl_4$, $TiCl_4$, $BF_3$ and the like, or an acid clay such as Montmorillonite, Attapulgus or the like, and in the substantial absence of air or oxygen. (By Lewis acid is meant any compound which accepts electrons as defined in Fieser and Fieser, "Advanced Organic Chemistry" (1961), pp. 19 and 492.) The reaction conditions are not particularly critical. Temperatures of 25 to 30° C. are suitable but may range up to 100° C. Atmospheric pressure is usually employed. The time is not critical as long as the proper interaction between the phosphorus compound and the resin takes place. The reaction is best run in chlorinated solvents, but hydrocarbons such as cyclohexane, heptane, etc., can be used as well. The reaction may be quenched with water, alcohols such as methyl, ethyl, propyl, isopropyl, butyl, etc., polyhydric alcohols such as ethylene glycol, propylene glycol, trimethylene glycol, glycerol, ammonia, amines, diamines, or other compounds which will complex or destroy the Friedel-Crafts compound. Normally, the terminating reagent is used in sufficient quantity to insure replacement of the labile phosphorous chlorines, thus forming functional groups such as the phosphorous acid, ester, or amide in the same operation. This results in the formation of a resin having the following probable structure.

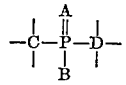

in which A represents oxygen, B represents —OH, alkoxy, $-NH_2$, $-RNH_2$, $R_2NH$, $R_3N$ where R is alkyl or aryl and C and D represent the same or different polymer chains.

Prior to phosphorylation, the resin, above described, may be partially hydrogenated to reduce the color. This is accomplished by contacting the resin with hydrogen in the presence of a metal of Group VI or VIII of the Periodic Table, e.g. nickel, palladium, platinum, nickel sulfide, copper chromite, cobalt molybdate which may be supported on light porous or granular particles of large surface area such as alumina, pumice, clay, charcoal, etc. The hydrogenation is effected under a pressure of about 100 to 5000 p.s.i.g., preferably about 500 to 3000 p.s.i.g., at temperatures of 40 to 400° C., preferably 150 to 260° C., under a hydrogen rate of about 100 to 2000 standard cubic feet per barrel of resin solution with a liquid feed rate of 0.1 to 5, preferably 1 to 2 v./v./hr., i.e. volumes of liquid feed per volume of catalyst per hour.

The phosphorylated resin of this invention, produced as indicated above, has a Gardner color less than 9, a molecular weight of 1000 to 10,000, a softening point 40–150° C. higher than the unphosphorylated resin, is stable to oxidation and contains useful functionality in the form of phosphorus acid, ester or amide, etc. depending on the reagent selected to terminate the phosphorylation reaction. Phosphorus content may range from as little as 0.2 weight percent to over 10 weight percent.

SPECIFIC EMBODIMENTS

For a more complete understanding of the invention, reference is had to the following examples.

Example 1

The feed or raw material which was subjected to polymerization was made by steam-cracking a gas oil petroleum fraction derived from a paraffinic type crude, the cracking being carried out at a temperature of about 1300 to 1450° F. and pressure of 5 to 20 p.s.i.g. in the presence of about 70 to 80 mol percent of steam.

The approximate analysis of the resultant steam-cracked fraction (boiling 50–230° C.), after debutanizing, was as follows:

| | Volume percent |
|---|---|
| $C_5$ cyclodiolefins | 5 |
| Aliphatic $C_5$ diolefins | 5 |
| $C_5$ olefins | 20–21 |
| $C_6$–$C_8$ diolefins | 8–10 |
| $C_6$–$C_8$ olefins | 14–15 |
| $C_9$–$C_{12}$ diolefins | 3 |
| $C_9$–$C_{12}$ olefins | 4 |
| Benzene | 15 |
| Toluene | 10 |
| Xylenes | 2–3 |
| $C_9$–$C_{12}$ aromatics | 5–6 |
| Paraffins | 3 |

The above steam-cracked fraction was subjected to heat soaking and distillation to remove pentenes, isoprene, cyclodienes, and heavy aromatic fractions to produce a feed stock having a boiling range of 50 to 170° C. and the following approximate analysis.

| | Volume percent |
|---|---|
| Pentenes | 4 |
| Isoprene | 2 |
| Piperylenes | 8 |
| Acetylenes | 1 |
| Cyclodienes | 2 |
| Benzene | 40 |
| Toluene | 10 |
| $C_6$–$C_8$ diolefins | 13 |
| $C_6$–$C_8$ olefins | 20 |

The product was then polymerized in a continuous flow unit at a temperature of 90–130° F. for a reactor residence time of about one-half hour with about 1 weight percent $AlCl_3$ catalyst based on feed. From the reactor the resin stream was passed into a "drowning drum" where the catalyst was decomposed with water and steam at approximately 200° F. The aqueous phase was allowed to separate and the resin stream was then subjected to several washing cycles at elevated temperature and pressure to further remove inorganic residues. From a settler the stream was fed into a furnace and flash tower to remove unreacted feed components. The final product emerging from the stripping operation possessed a 30–40° C. softening point and contained 90–92% solid resin.

Example 2

The resin of Example 1, which contains 90–92% solid resin, was stripped of polymeric oils by heating to a maximum bottoms temperature of 390–420° F. at 5–10 mm. Hg for at least one hour. Analyses for the resultant resin were; softening point 105° C., molecular weight (osmometer) 1780, and Gardner color 10. This product is sold to Pennsylvania Chemical Corp. as PRLA resin and marketed as Piccopale resin.

Example 3

88 grams of the resin of Example 1 was dissolved in 200 ml. of dichloroethane and mixed with 20.5 grams of $PCl_3$ and 20 grams of $AlCl_3$. After ninety minutes reaction time at 30° C. the mixture was hydrolyzed over cracked ice. Two products were isolated from the hydrolyzed material, a hydrocarbon soluble and a hydrocarbon insoluble fraction. The hydrocarbon soluble fraction was separated from the insoluble fraction by extraction with benzene. Recovery from benzene was accomplished by the stripping procedure described in Example 2. The hydrocarbon insoluble fraction was recovered by drying under high vacuum (<5 mm.) until a constant weight was obtained. The following data were obtained:

| Product | Molecular | Softening Point, ° C. | Percent P | Percent O |
|---|---|---|---|---|
| Soluble fraction (52 g.) | 2,104 | 140 | 1.34 | 1.25 |
| Insoluble fraction (27 g.) | | >300 | 11.90 | 11.50 |
| Starting resin | 1,780 | 105 | 0. | Trace |

The above data show that the softening point of the resin can be greatly increased by the phosphorylation process of the present invention.

Example 4

The resin of Example 2 which contained 185 p.p.m. of organic sulfur was dissolved in dry benzene and contacted with $PCl_3$ and oxygen. No reaction occurred after four hours of contact at 27° C. and the resin was recovered from the reaction mixture unchanged.

Example 5

Four samples of the resin of Example 2 were dissolved in dichloroethane and phosphorylated by adding first the selected quantity of $PCl_3$ and second a mole equivalent quantity of $AlCl_3$. The mixture was stirred for one hour at 25° C. and the products quenched with water, methyl alcohol or ammonia. In each instance, regardless of the quenching reagent, successive water washes were employed to remove aluminum salts, unreacted $PCl_3$, acid residues and the excess quenching reagent. The washed solutions were then treated with a large volume of methyl alcohol to precipitate the resin which was collected as a granular solid by filtration. The resin was then dried by applying mild heat (50–60° C.) under high vacuum (5–10 mm.) for periods up to twenty hours, or until a constant weight was obtained. Phosphorylated resin yields varied between 95–100% of theoretical. The following data were obtained:

| Reactants | | | Quench | Product | Product Analyses | | | |
|---|---|---|---|---|---|---|---|---|
| Resin (g.) | $PCl_3$ | $AlCl_3$ | | | Percent P | Percent O | Melting Point, ° C.[1] | Odor |
| 75 | 7.7 | 7.5 | $H_2O$ | Resin=$\left(P\begin{smallmatrix}\nearrow O\\ \searrow OH\end{smallmatrix}\right)_x$ | 1.8 | 2.12 | ca. 200 | None. |
| 100 | 20.5 | 20.0 | $H_2O$ | Resin=$\left(P\begin{smallmatrix}\nearrow O\\ \searrow OH\end{smallmatrix}\right)_x$ | 4.00 | 4.58 | >300 | Do. |
| 50 | 10.2 | 10.0 | $CH_3OH$ | Resin=$\left(P\begin{smallmatrix}\nearrow O\\ \searrow OCH_3\end{smallmatrix}\right)_x$ | 5.25 | 5.32 | ca. 275 | Do. |
| 50 | 10.2 | 10.0 | $NH_3$[2] | Resin=$\left(P\begin{smallmatrix}\nearrow O\\ \searrow OC_3\end{smallmatrix}\right)_x$ | 4.29 | 2.13 | >300 | Do. |

[1] Determined on Fisher hot stage, softening points all exceeded the maximum of 150° F. determinable by the ASTM ball and ring method.
[2] Anhydrous ammonia was used. Product contained 1.75 wt. percent nitrogen, which is 89% of the theoretical amount, based on structure shown.

The above data show that the softening points of phosphorylated resins are much higher than those of the untreated resin and that undesirable odors are eliminated by phosphorylation. They also demonstrate the versatility of the phosphorylation reaction in terms of the types of phosphorus-containing groups that can be introduced into the resin. Only one product was obtained in these runs as compared with the two products obtained in Example 3, thus emphasizing the importance of the stringent stripping conditions, i.e. to obtain softening points above 90° C., for the starting resin.

Example 6

The resin of Example 2 in heptane diluent (20 wt. percent) was hydrogenated in a continuous unit at 200° C. and 1000 p.s.i.g. on a nickel sulfide catalyst at a feed rate of 1 v./v./hr. using 200 to 700 standard cubic feet of hydrogen per barrel of feed. The resulting resin had a Gardner color of 1.5 but a softening point of only 65° C. (due to severe conditions occurring at the unit start-up). A solution of 75 grams of this hydrogenated resin in 250 ml. of 1,2-dichloroethane at ambient temperature (27° C.) was then reacted for forty-five mniutes with 7.5 grams of $PCl_3$ and 7.4 grams of $AlCl_3$. The reaction was terminated by adding water and the organic layer was then washed successively with hot water to remove unreacted $PCl_3$ and $AlCl_3$ and to hydrolyze the chlorine in the resin. After removing the solvent, 70 grams of a resin was obtained, having a softening point of 100° C. (M.P. 95–105° C.), a Gardner color of 5.5 and containing 1.40 wt. percent of phosphorus or about 60% of the theoretical amount.

Example 7

A solution of 70 grams of a resin prepared from the feed of Example 2 and hydrogenated in accordance with the procedure of Example 6 and having a softening point of 101° C. and a Gardner color 2.5 was mixed with 300 ml. of 1,2-dichloroethane and reacted at ambient temperature (27° C.) for one hour with 10.2 grams of phosphorus trichloride and 10.0 grams of anhydrous aluminum chloride. The reaction was terminated by adding water and the organic layer was then washed successively with hot water to remove unreacted $PCl_3$ and $AlCl_3$ and to hydrolyze the chlorine in the resin. After removing the solvent, 63 grams of a resin was obtained, having a softening point in excess of 150° C. (M.P. 155–160° C.), a Gardner color of 8 and containing 2.46 wt. percent phosphorus or about 80% of the theoretical amount.

Example 8

75 grams of the resin of Example 2 was dissolved in 250 ml. of 1,2-dichloroethane and phosphorylated by adding first 18.76 grams of $PCl_3$ and second 18.65 grams of $AlCl_3$. The reaction was allowed to proceed forty-five minutes at room temperature, then 68 grams of ethylene glycol was added and stirring was continued for an additional forty-five minutes. Next, the resin solution was washed with water to remove aluminum salts, unreacted $PCl_3$ and acid residues. The phosphorylated resin was then precipitated from solution by adding methyl alcohol and dried under high vacuum (<5 mm.) for twenty hours. There was obtained 60 grams of phosphorylated resin, melting point 250° C., color 9 Gardner and M.W. 24,400 which indicated that ethylene glycol effectively crosslinked the resin by ester formation with the phosphorous groups. Analyses showed 4.30 wt. percent phosphorus, and 8.7 wt. percent oxygen in the resin.

Example 9

A mixture of 75 grams of a resin made as in Example 2 and having a softening point of 104° C., 400 ml. of 1,2-dichloroethane and 15.5 grams of phosphorus trichloride was stirred for one hour at 45° C. with 46 grams of a moderately calcined, Montmorillonite clay (ca. 0.6 wt. percent water). The reaction was then terminated by the addition of 300 ml. of water and the clay was removed by filtration. The organic layer was washed with water to remove unreacted phosphorous compounds and was concentrated by distillation to a pot temperature of 160° C. Distillation was then continued for ten minutes at 220° C. and 3 mm. to remove traces of solvent from the resin product. There was recovered 60 grams of resin, softening point 118° C., which by analysis contained 0.75 wt. percent oxygen and 0.40 wt. percent phosphorous (ca. 10% of the theoretical amount).

Example 10

75 grams of the resin of Example 2 was dissolved in 250 ml. of methylene chloride and then was treated with a phosphorylating reagent composed of 15 grams of phosphorus oxy chloride and 13.3 grams of anhydrous aluminum chloride. After one hour at ambient temperature (27° C.) the reaction was terminated by adding water. Successive water washes were then employed to remove unreacted $POCl_3$, $AlCl_3$ and hydrochloric acid from the organic layer. The washed solution was then treated with a large volume of methyl alcohol to precipitate the resin, which was collected as a granular solid by filtration. The resin was dried by applying mild heat (50–60° C.) under high vacuum (5–10 mm.) for eight hours. There was obtained in this manner 76 grams of resin, S.P. 134.5° C., Gardner color 13, which analyzed for 0.9 wt. percent phosphorus, and 2.04 wt. percent oxygen.

Example 11

70 grams of the resin of Example 2 was dissolved in 400 ml. of cyclohexane and phosphorylated by adding first 17 grams of phosphorus trichloride and second 16.8 grams of aluminum chloride. The reaction was allowed to proceed for one hour and was then terminated by adding an equal volume of a 3 to 1 mixture of water to isopropyl alcohol. Inorganic residues were removed from the resin solution by successive hot water washes. The resin was recovered from the solution by precipitation with isopropyl alcohol and was then dried to a constant weight by applying mild heat under 5–10 mm. pressure. There was obtained 58 grams of phosphorylated resin, softening point >150° C., Gardner color 14, which contained 2.15 wt. percent phosphorus and 3.09 wt. percent oxygen.

While the above description and examples have been limited to the phosphorylation of resins made from steam-cracked fractions substantially free from reactive aromatic hydrocarbons, it is also equally adaptable to the phosphorylation of resins by clay polymerization of substantially reactive aromatic hydrocarbon free olefinic feeds, known as CTLA polymer.

The nature of the present invention having been fully set forth and specific examples of the same given, what is claimed as new and useful and desired to be secured by Letters Patent is:

1. A process for the preparation of petroleum resin having high softening point, low color and no odor which comprises polymerizing cracked petroleum fractions boiling 20–140° C. and containing 10 to 65 wt. percent of unreactive aromatic hydrocarbons, 30 to 80 wt. percent of olefins, 10 to 30 wt. percent of diolefins and 0 to 5 wt. percent of unreactive paraffins, with a catalyst chosen from the group consisting of Friedel-Crafts catalysts to produce a resinous product, stripping said liquid polymer to give a resin having a softening point of 90–110° C., reacting the resulting resin with 0.5 to 100 weight percent of a phosphorus compound chosen from the group consisting of $PCl_5$, $PCl_3$, $POCl_3$, $RPCl_2$, $R_2PCl$, $ROPCl_2$ and $(RO)_2PCl$ where R is alkyl or aryl in the presence of an equimolar amount of a Lewis acid at a temperature of 25 to 100° C. in the absence of oxygen, quenching the reaction with an agent chosen from the group consisting of water, monohydric alcohols, polyhydric alcohols, ammonia, monoamines, and diamines and separating the phosphorylated resin.

2. The process according to claim 1 in which the catalyst is $AlCl_3$.

3. The process of claim 2 in which the phosphorus compound is $PCl_3$, the Lewis acid is $AlCl_3$ and the reaction is quenched with $CH_3OH$.

4. The process of claim 2 in which the reaction is quenched with water.

5. The process of claim 2 in which the quenching agent is an alcohol.

6. The process of claim 5 in which the alcohol is methyl alcohol.

7. The process of claim 5 in which the alcohol is isopropyl.

8. The process of claim 2 in which the quenching agent is a glycol.

9. The process of claim 8 in which the glycol is ethylene glycol.

10. The process of claim 2 in which the quenching agent is anhydrous ammonia.

References Cited

UNITED STATES PATENTS

| | | | |
|---|---|---|---|
| 2,779,750 | 1/1957 | Fuqua et al. | 260—82 |
| 2,844,546 | 7/1958 | Abrams | 260—2.2 |
| 2,963,467 | 12/1960 | Small | 260—82 |

JAMES SEIDLECK, *Primary Examiner.*